March 2, 1937.  H. N. WAYNE  2,072,349
MOLD AND METHOD OF MOLDING
Filed June 6, 1934
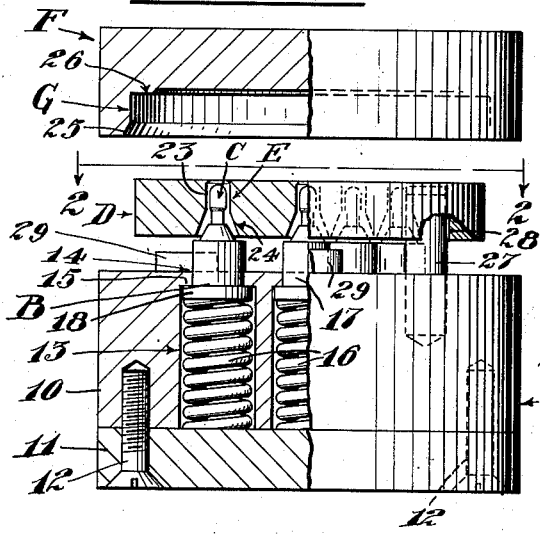
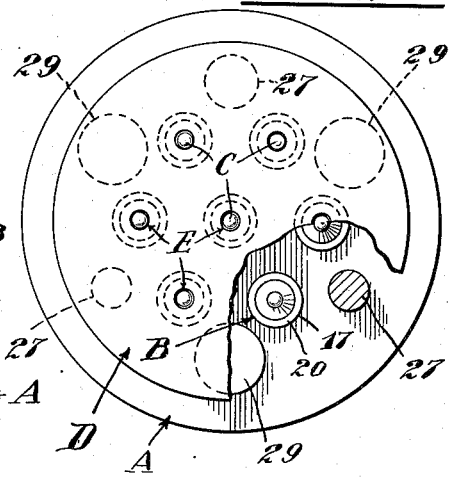
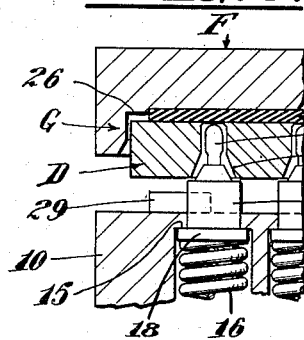
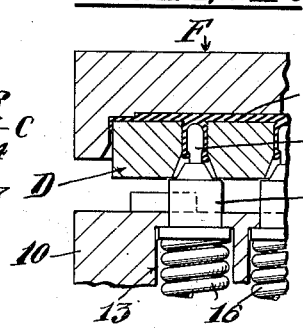
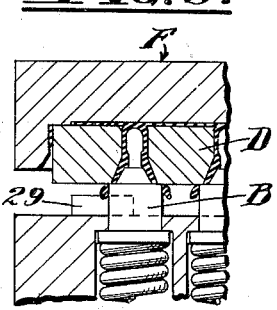
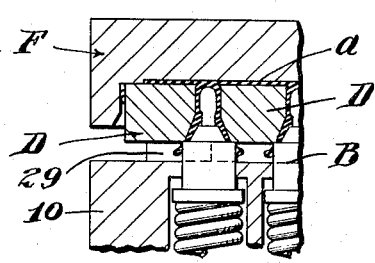
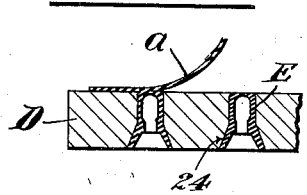
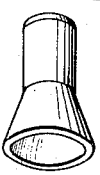
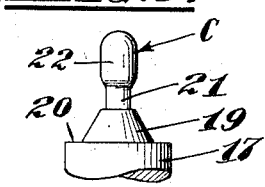
Inventor.
Herbert N. Wayne.
By
R. S. Berry
Atty.

Patented Mar. 2, 1937

2,072,349

UNITED STATES PATENT OFFICE 2,072,349

MOLD AND METHOD OF MOLDING

Herbert N. Wayne, Santa Monica, Calif.

Application June 6, 1934, Serial No. 729,215

11 Claims. (Cl. 18—5)

This invention relates to a mold and more particularly pertains to a device for molding small sockets or shells of rubber or rubber composition, and has as one of its objects the provisions of a multiple of molds whereby a plurality of small hollow rubber articles may be molded of raw rubber, cured and trimmed in a single operation.

Another object is to provide a mold for forming rubber sockets or shells for tooth brushes of the type used by dentists in dental machines, in which the socket or shell is formed with a bristle receiving recess the outer end of which is flared; a particular object being to provide a construction in the mold which will insure formation of the socket or shell of definite dimensions and with the flared end neatly finished.

Another object is to provide a mold in which a multiplicity of the small tubular rubber articles may be molded from a single flat sheet of raw rubber.

With the foregoing objects in view, together with such other objects and advantages as may subsequently appear, the invention resides in the parts and in the combination, construction and arrangement of parts hereinafter described and claimed and illustrated by way of example in the accompanying drawing in which:

Fig. 1 is a view of the mold as seen in side elevation partly in vertical section showing the parts as disposed in their initial relative positions;

Fig. 2 is a view taken on the line 2—2 of Fig. 1 with parts broken away;

Figs. 3, 4, 5, 6 and 7 are diagrams in section illustrating the successive steps of operation of the mold in the production of the molded article;

Fig. 8 is a perspective view of the rubber socket or shell constituting the product of the mold;

Fig. 9 is a detail view in elevation of a mold member as detached.

Referring to the drawing more specifically A indicates generally the base portion of the mold which is here shown as in the form of a vertically extending cylinder composed of upper and lower sections 10 and 11 connected together by screws 12 and which cylinder is flat on its upper and lower faces and is adapted to be seated on any suitable support. The upper section 10 is formed with a series of cylindrical chambers 13 which are closed at their lower ends by the section 11 and which open at their upper ends to the top flat face of the section 10 through circular openings 14 of a diameter slightly less than that of the chambers thus providing a circular flange or shoulder 15 at the upper end of each chamber.

Arranged in each of the chambers 13 is a coil spring 16 the lower end of which seats on the section 11 and the upper end of which bears against the under side of a mold member B having a cylindrical base portion 17 projecting upwardly through the opening 15 and having a flange 18 on its lower end arranged to abut against the under side of the shoulder 15 to limit upward movement of the mold member B under the urge of the spring 16 which latter thus affords a yieldable support for the mold member B. A core C is formed on the upper end of the cylindrical base 17 and comprises a frusto-conical member 19 protruding from the upper end of the cylinder 17 with its base margin spaced inwardly from the upper margin of the cylinder 17 to provide a flat annular rim 20 on the latter, and extending from the upper end of the frusto-conical member 19 is a stem 21 terminating in an enlarged cylindrical end portion 22.

The cylinder 17, member 19, stem 21 and portion 22 extend in axial alignment with each other.

The several mold members B are supplementary and extend equi-distant above the upper face of the base member A with the annular rims 20 extending on a common plane and with the upper ends of the cores C terminating on a common plane when the mold members are in their normal position as shown in Fig. 1.

Associated with the base A is a mold member D here shown as comprising a circular disk formed with a plurality of mold cavities E arranged to receive the upwardly projecting cores C on the mold members B; the mold member D being removable relative to the base member A and the cores C. The mold cavities E each consist of openings which pass completely through the mold plate D and have cylindrical upper portions 23 arranged to encircle the cylindrical upper ends 22 of the cores C and having outwardly flared lower end portions 24 arranged to encircle the frusto-conical member 19 of the core in spaced relation thereto. The lower margin of the flared portion of a mold cavity is of a diameter less than that of the outside diameter of the annular rim 20 on a cylinder 17 and of slightly greater diameter than the base portion of a frusto-conical member 19 so that the mold member D may be positioned to seat on the upper ends of the cylinders 17.

The mold member D is flat on its upper and lower faces and is of such thickness that when its lower face is seated on the upper ends of the cylinders 17 the upper face of the mold member D will extend on a plane spaced a short distance above the upper ends of the cores C, as particularly shown in Fig. 1.

A removable cap F is provided for positioning over the mold member D which is here shown as cylindrical in form and as provided with a circular recess G on the under side thereof adapted to receive the mold member D and having a diameter slightly larger than that of the mold member D, and which recess is flared at its lower margin as indicated at 25 to facilitate its positioning over the mold member D. The bottom of the recess G is flat throughout the central portion thereof and is formed with a protruding marginal rim portion 26 adjacent the side wall of the recess, which rim is adapted to seat on the upper marginal portion of the mold member D so that when the member F is seated on the mold member D the upper face of the latter throughout its central portion will be spaced slightly from the bottom of the recess G.

Projecting upwardly from the top face of the base A is a series of dowel pins 27, the upper ends of which terminate on a plane below the upper ends of the cores C, which pins are designed to be extended into openings 28 on the under side of the mold member D to position the latter with the cores C centrally arranged in the mold cavities E.

As a means for limiting downward movement of the mold member D a series of three upstanding stops 29 are provided on the base member A which terminate at their upper ends beneath the mold member D on a plane slightly below the plane of the upper ends of the cylinders 17 of the mold members B.

In the operation of the invention the base A is seated on the supporting member of a press with the mold member D seating on the mold members B and with a sheet R of raw or uncured rubber interposed between the die member and the cap F, as particularly shown in Fig. 3; the sheet rubber R extending over the mold cavities E.

The press is then operated to force the cap F downwardly on the mold members D thereby squeezing portions of the rubber extending opposite the cavities E into the latter around the upper end portions of the cores C as shown in Fig. 4. The cap F and mold member D are heated so as to soften the rubber R and thus facilitate its flowing into the cavities E. Continued movement of the press is effected to force the rubber into the mold cavities to completely fill the latter; the air content of the cavities being forced therefrom from the lower ends thereof as such air is displaced by the rubber entering the cavities. The sheet rubber R is of such thickness that when squeezed between the cap F and the mold member D a sufficient quantity of rubber will be directed into the mold cavities to completely fill the latter and also cause a small portion of the rubber to overflow from the lower ends of the cavity around the mold members B, as shown in Fig. 5, before the mold member D is advanced to its lowermost position.

The springs 16 are of such tension as to oppose any appreciable downward movement of the mold members B during this initial forcing of the rubber into the mold cavities, but as the pressure applied to the cap F increases after filling of the mold cavities the mold members B are collectively forced downwardly in opposition to the springs 16 until the mold member D is brought to rest on the stops 29. The opposing pressures of the cap F and the springs 16 then serve to compress the rubber in the mold cavities and at this time cause the annular rims 20 on the mold members B to sever the excess rubber forced from the lower ends of the mold cavities thereby trimming the lower edges of the molded socket 5 as particularly shown in Fig. 6. At this stage of operation the mold is heated sufficiently to effect the desired vulcanizing of the rubber which in this instance is cured to a state of resiliency.

The pressure is then released and the cap F removed leaving a thin film of rubber on top of the mold plate D, as indicated at a in Fig. 6, which film unites the upper end portions of the several molded articles in the mold cavities. The mold D is then removed from the mold members B by lifting it therefrom which operation withdraws the cores C from the molded articles in the mold cavities which articles are retained in the cavities by the resistance afforded by the rubber film a against their being withdrawn with the cores. The rubber film a is then sliced from the upper end of the molded members as shown in Fig. 7 thus leaving the rubber sockets in the mold cavities from which they may be ejected in any suitable fashion. The resulting product is a socket or shell formed as shown in Fig. 8, having edges which require no trimming on the completion of the molding operation and which edges will be finished smooth on removal of the product from the mold. From the foregoing it will be seen that the invention affords a ready means for forming small tapered sockets or shells from sheet rubber, and especially in molding a multiplicity of such articles from a single sheet in one operation. It will also be seen that the invention facilitates the removal of the molded articles from the mold structure, and especially where the cores C, as here shown, are formed with an enlarged end portion 22, or knob, on a narrow stem 21 around which portion and stem the rubber is molded whereby on withdrawing the cores C from the enlarged ends of tapered mold cavities the knobs 22 would ordinarily withdraw the molded articles from the cavities leaving the articles on the cores which would then necessitate removing each of the molded articles individually from the several cores. This however is obviated by the formation of the film a uniting the several molded articles in the mold cavities at the small ends thereof thereby preventing the molded articles from being removed from the mold cavities with the cores. Then by slicing the film a from the small ends of the molded articles on removal of the cores from the mold cavities, the molded articles may be readily removed by ejecting them from the enlarged end portions of the mold cavities.

While I have shown and described a specific embodiment of the invention I do not limit myself to the exact details of construction and arrangement shown but may employ such changes and modifications as occasion may require coming within the meaning and scope of the appended claims.

I claim:

1. A device for molding rubber sockets comprising a mold member formed with a plurality of cores, a second mold member formed with a plurality of mold cavities adapted to receive said cores and having a flat upper face, said cavities opening upwardly through said second mold member and having reduced upper ends, and a cap adapted to be positioned over said second mold member and operable to force rubber downwardly into the mold cavities around said cores, said cores having their upper ends terminating in inwardly spaced relation to the outer ends of the mold cavities, and said cap having a mold recess to mold a film of rubber on the upper face of the second mold member uniting bodies of rubber in the mold cavities.

2. In a device for molding rubber sockets, a base, a plurality of mold members carried by said base and movable vertically relative thereto, yieldable means for normally maintaining said mold members in their uppermost position, upwardly projecting cores carried by said mold members, a demountable mold plate formed with a flat outer face having a series of mold cavities extending therethrough formed with reduced upper ends, said plate being adapted to be positioned to seat on said mold members with said cores projecting into said cavities and terminating in inwardly spaced relation to the upper face of said mold plate, and means for forcing rubber from a sheet thereof downwardly through the upper ends of the mold cavities to fill the latter around said cores and to form a film of sheet rubber on the outer face of said plate uniting the molded articles formed in said cavities.

3. In a device for molding rubber sockets, a base, a plurality of mold members carried by said base and movable vertically relative thereto, yieldable means for normally maintaining said mold members in their uppermost position, upwardly projecting cores carried by said mold members, a demountable mold plate formed with mold cavities extending therethrough and adapted to be positioned to seat on said mold members with said cores projecting into said cavities and terminating in inwardly spaced relation to the upper face of said mold plate, means for forcing rubber from a sheet thereof downwardly through the upper ends of the mold cavities to fill the latter around said cores and to form a film of sheet rubber on the outer face of said plate uniting the molded articles formed in said cavities, and means on said mold members cooperating with said mold plate for trimming the lower ends of the molded bodies formed in said mold cavities.

4. The method of molding rubber sockets consisting in pressing raw rubber from a sheet in a heated condition downwardly into a mold cavity containing a core, forming a film of rubber around the upper margin of the mold cavity integral with the rubber contained in the cavity to hold the molded articles in the mold cavities on subsequently withdrawing the cores therefrom, curing the rubber thus molded, removing the core downwardly from the molded article, then severing the film from the upper margin of the molded article, and then removing the molded article from the lower end of the mold cavity.

5. The method of molding hollow rubber articles having enlarged end portions consisting in pressing raw rubber from a sheet in a heated condition into the reduced ends of a series of tapered mold cavities containing cores, forming a film of rubber around the reduced margins of the mold cavities integral with the rubber contained in the cavities and thereby uniting the several molded articles and preventing their withdrawal from the enlarged ends of the mold cavities, curing the rubber thus molded, removing the cores from the molded articles in the mold cavities, then severing the film connecting the reduced ends of the mold cavities, and finally ejecting the molded articles from the enlarged ends of the mold cavities.

6. The method of forming frusto-conical molded rubber articles consisting in pressing plastic unvulcanized rubber composition into the reduced ends of a series of tapered mold cavities, filling the cavities and forming a sheet of rubber connecting a series of the molded articles together at their smaller ends, vulcanizing the rubber thus molded, removing the connecting sheet by severing it from the molded articles along the plane of the reduced ends of the mold cavities thereby permitting the removal of the molded articles through the enlarged ends of the mold cavities.

7. In a device for molding tapered rubber sockets, a mold member formed with a series of frusto-conical mold cavities opening therethrough, said mold member having a flat face at the reduced ends of said cavities, cores arranged in said cavities extending thereinto from the enlarged ends thereof and terminating adjacent the flat face of said mold member, means for forcing plastic rubber from a sheet thereof into the reduced ends of said mold cavities to fill the latter around said cores and to form a film of sheet rubber on the flat face of said mold member uniting the molded bodies formed in said cavities.

8. In a device for molding tapered rubber sockets, a mold member formed with a series of frusto-conical mold cavities opening therethrough, said mold member having a flat face at the reduced ends of said cavities, cores arranged in said cavities extending thereinto from the enlarged ends thereof and terminating adjacent the flat face of said mold member, means for forcing plastic rubber from a sheet thereof into the reduced ends of said mold cavities to fill the latter around said cores and to form a film of sheet rubber on the flat face of said mold member uniting the molded bodies formed in said cavities, and means for severing overflow rubber from the margins of the enlarged ends of said cavities.

9. In a device for forming molded rubber articles, a mold member having a flat upper face and formed with a plurality of mold cavities extending downwardly therethrough having reduced upper ends, a vertically movable cap arranged over said mold member and movable theretoward to force rubber from a sheet thereof downwardly into the upper ends of said mold cavities; said cap having a mold recess on its under side arranged to form a film of rubber on the flat upper face of the mold member to unite the molded articles at the reduced ends of the mold cavities.

10. In a device for forming molded rubber articles, a mold member formed with a plurality of spaced mold cavities extending downwardly therethrough having reduced upper ends, a vertically movable cap arranged over said mold member and movable theretoward to force rubber from a sheet thereof downwardly through the upper ends of said mold cavities and for forming a body of rubber on the mold member uniting the molded articles at the reduced ends of the mold cavities.

11. The method of molding rubber articles consisting in pressing raw rubber from a sheet in a heated condition into the reduced ends of a series of tapered mold cavities and forming a body of rubber interconnecting the reduced ends of the molded bodies in the mold cavity, curing the rubber thus molded, and severing the body of rubber from the upper margins of the molded articles while in the molds to permit removal of the molded article from the lower end of the mold cavity.

HERBERT N. WAYNE.